United States Patent
Ji et al.

(10) Patent No.: US 8,917,700 B2
(45) Date of Patent: Dec. 23, 2014

(54) METHOD AND APPARATUS FOR INTERFERENCE MITIGATION IN WIRELESS NETWORKS

(75) Inventors: Tingfang Ji, San Diego, CA (US); Osok Song, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/232,883

(22) Filed: Sep. 14, 2011

(65) Prior Publication Data
US 2012/0069756 A1   Mar. 22, 2012

Related U.S. Application Data

(60) Provisional application No. 61/384,163, filed on Sep. 17, 2010.

(51) Int. Cl.
*H04W 4/00* (2009.01)
*H04W 36/00* (2009.01)
*H04W 36/30* (2009.01)

(52) U.S. Cl.
CPC .......... *H04W 36/0016* (2013.01); *H04W 36/30* (2013.01)
USPC ........................................................ 370/331

(58) Field of Classification Search
USPC ............................ 370/328–339; 455/436–444
See application file for complete search history.

(56) References Cited

U.S. PATENT DOCUMENTS

| | | | |
|---|---|---|---|
| 6,473,614 B1 * | 10/2002 | Quensel et al. ............... | 455/436 |
| 6,567,670 B1 | 5/2003 | Petersson | |
| 7,664,467 B2 | 2/2010 | Cheng et al. | |
| 2004/0058678 A1 * | 3/2004 | deTorbal ........................ | 455/437 |
| 2009/0154425 A1 | 6/2009 | Patil et al. | |
| 2009/0219893 A1 | 9/2009 | Korpela et al. | |
| 2009/0323638 A1 * | 12/2009 | Catovic et al. ................ | 370/331 |
| 2010/0008230 A1 | 1/2010 | Khandekar et al. | |
| 2010/0124203 A1 | 5/2010 | Tenny et al. | |
| 2010/0173626 A1 * | 7/2010 | Catovic et al. ................ | 455/423 |
| 2010/0195619 A1 | 8/2010 | Bonneville et al. | |
| 2010/0240382 A1 | 9/2010 | Sampath et al. | |
| 2011/0117908 A1 * | 5/2011 | Huang et al. .................. | 455/423 |

(Continued)

FOREIGN PATENT DOCUMENTS

| | | |
|---|---|---|
| EP | 1 401 229 A1 | 3/2004 |
| EP | 1401229 A1 | 3/2004 |

(Continued)

OTHER PUBLICATIONS

3GPP TR 36.902 V9.1.0, Self-configuring and self-optimizing network (SON) use cases and solutions (Release 9), 23 pages, Mar. 2010.*

(Continued)

*Primary Examiner* — Frank Duong
(74) *Attorney, Agent, or Firm* — Arent Fox LLP

(57) ABSTRACT

Methods and apparatuses are provided that include mitigating interference for devices communicating with femto nodes or other low power base stations by assigning protected resources for communicating therewith. The protected resources can be negotiated with a macrocell base station using interference cancellation. The protected resources can be assigned based on an early or late handover event, which can indicate that the device may be susceptible to interference from the macrocell base station.

36 Claims, 10 Drawing Sheets

(56) References Cited

U.S. PATENT DOCUMENTS

| 2011/0244863 | A1 | 10/2011 | Matsuo et al. |
| 2011/0312327 | A1 | 12/2011 | Kubota |
| 2012/0307808 | A1 | 12/2012 | Song et al. |

FOREIGN PATENT DOCUMENTS

| JP | 2004527166 A | 9/2004 |
| JP | 2010130253 A | 6/2010 |
| JP | 2010183573 A | 8/2010 |
| WO | 02073831 A1 | 9/2002 |
| WO | 2010002926 A1 | 1/2010 |
| WO | 2010006297 A2 | 1/2010 |
| WO | 2010057127 A1 | 5/2010 |
| WO | WO 2010/057128 A1 | 5/2010 |
| WO | WO2010057128 | 5/2010 |
| WO | 2010070854 A1 | 6/2010 |
| WO | 2010100857 A1 | 9/2010 |

OTHER PUBLICATIONS

3GPP TS 36.331 V9.3.0: 3rd Generation Partnership Project; Technical Specification Group Radio Access Network; Evolved Universal Terrestrial Radio Access (E-UTRA); Radio Resource Control (RRC); Protocol specification (Release 9) (Jun. 2010), pp. 1-250.

Hauwei: "Addressing the requirements for HO optimisation", 3GPP Draft; S5-081672 Addressing the Requirements for HO Optimisation, 3rd Generation Partnership Project (3GPP), Mobile Competence Centre; 650, Route Des Lucioles; F-06921 Sophia-Antipolis Cedex; France, no. Dalian, Chinal Oct. 6, 2008, XP050335753, [retrieved on Oct. 6, 2008] section 3.1, 3.2, 3.3.2, 3.4, 4.3.1.1.

International Search Report and Written Opinion—PCT/US2011/051829—ISA/EPO—Dec. 1, 2011.

Huawei, "Addressing the requirements for HO optimisation", 3GPP Draft; S5-081672 Addressing the Requirements for HO Optimisation, 3rd Generation Partnership Project (3GPP), Mobile Competence Centre; 650 Route des Lucioles; F-06921 Sophia-Antipolis Cedex, France, no. Dalian, China, Oct. 6, 2008, XP050335753.

"3rd Generation Partnership Project; Technical Specification Group Radio Access Network; Evolved Universal Terrestrial Radio Access (E-UTRA); Radio Resource Control (RRC); Protocol specification (Release 9)", 3GPP Standard; 3GPP TS 36.331, 3rd Generation Partnership Project (3GPP), Mobile Competence Centre; 650, Route des Lucioles; F-06921 Sophia-Antipoles Cedex, France, No. V9.3.0, Jun. 17, 2010, pp. 1-250, XP050441910.

Alcatel-Lucent Shanghai Bell, Alcatel-Lucent, Cell Association for HetNet, 3GPP TSG RAN WG1 Meeting #62 R1-104418, Aug. 17, 2010, URL: http://www.3gpp.orgiftp/tsg_ran/WG1_RL1/TSGR1_62/Docs/R1-104418.zip, p. 1-2.

NTT DoCoMo: "Downlink Interference Coordination Between eNodeB and Home eNodeB", 36PP Draft; R1-101225 HENB_ICIC, 3rd Generation Partnership Project (3GPP), Mobile Competence Centre; 650, Route des Lucioles; F-06921 Sophia-Antipolis Cedex; France, vol. RAN WGI, no. San Francisco, USA; 20100222, Feb. 16, 2010, XP050418740, [retrieved on Feb. 16, 2010], p. 1-8.

Translation of First Office Action issued in Japanese Patent Application No. 2013-529344, dated Apr. 1, 2014, 8 pages.

* cited by examiner

METHOD AND APPARATUS FOR INTERFERENCE MITIGATION IN WIRELESS NETWORKS

CLAIM OF PRIORITY UNDER 35 U.S.C. §119

The present application for patent claims priority to Provisional Application No. 61/384,163, entitled "JOINT RADIO RESOURCE MANAGEMENT AND INTERFERENCE MITIGATION PROCEDURES FOR WIRELESS NETWORKS" filed Sep. 17, 2010, assigned to the assignee hereof and hereby expressly incorporated by reference herein.

BACKGROUND

1. Field

The following description relates generally to wireless network communications, and more particularly to considerations for mitigating interference.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

Since the low power base stations operate at a power significantly less than that of conventional macrocell base stations, where the low power base station is situated closer to a macrocell base station within a cell thereof, a device near the low power base station may experience increased power from the macrocell base station. In this case, the device may never handover to the low power base station, though services from the low power base station may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with mitigating interference among low power base stations (e.g., femto nodes), conventional base stations (e.g., macrocell base stations), and devices communicating therewith. A macrocell base station can perform an early handover of a device to a femto node such that the macrocell base station power measured by the device is over a threshold as compared to power of the femto node. The macrocell base station can indicate an early handover event to the femto node, and the femto node can select resources for the device that are protected from interference caused by the macrocell base station. For example, these resources can be negotiated between the macrocell base station and the femto node. Similarly, where the device is communicating with femto node, the femto node can configure a late handover event to delay handover to a macrocell base station for the device. In this example, when a power of the macrocell base station increases over a threshold difference from the power of the femto node, the femto node can similarly select resources for the device that are protected from interference by the macrocell base station. Thus, a device can communicate with the femto node when there is an interfering macrocell base station.

According to an example, a method for mitigating interference in a wireless network is provided. The method includes detecting a handover event related to a device communicating with a base station and determining whether the handover event is one of an early or late handover event. In addition, the method can include assigning a set of protected resources for communicating with the mobile device after the handover event, based on the handover event.

In another aspect, an apparatus for mitigating interference in a wireless network is provided. The apparatus includes means for detecting a handover event related to a mobile device communicating with a base station. The apparatus also includes means for assigning a set of protected resources for communicating with the mobile device based on determining whether the handover event is one of an early handover event or a late handover event.

In yet another aspect, an apparatus for mitigating interference in a wireless network is provided including at least one processor configured to detect a handover event related to a mobile device communicating with a base station and determine whether the handover event is one of an early handover event or a late handover event. The at least one processor is further configured to assign a set of protected resources for communicating with the mobile device after the handover event, based on the handover event. The apparatus further includes a memory coupled to the at least one processor.

Still, in another aspect, a computer-program product for mitigating interference in a wireless network is provided including a computer-readable medium having code for causing at least one computer to detect a handover event related to a mobile device communicating with a base station and code for causing the at least one computer to determine whether the handover event is one of an early handover event or a late handover event. The computer-readable medium further includes code for causing the at least one computer to assign a set of protected resources for communicating with the mobile device after the handover event, based on the handover event.

In another example, a method for mitigating interference in a wireless network is provided including detecting a handover event related to handing over communications of a mobile device to a base station and transmitting a handover message to the base station indicating whether the handover event corresponds to an early handover event.

In another aspect, an apparatus for mitigating interference in a wireless network is provided. The apparatus includes means for detecting a handover event related to handing over communications of a mobile device to a base station. The apparatus also includes means for transmitting a handover message to the base station indicating whether the handover event corresponds to an early handover event.

In yet another aspect, an apparatus for mitigating interference in a wireless network is provided. The apparatus includes at least one processor configured to detect a handover event related to handing over communications of a mobile device to a base station and transmit a handover message to the base station indicating whether the handover event corresponds to an early handover event. The apparatus further includes a memory coupled to the at least one processor.

Moreover, in another aspect, a computer-program product for mitigating interference in a wireless network is provided including a computer-readable medium having code for causing at least one computer to detect a handover event related to handing over communications of a mobile device to a base station. The computer-readable medium further includes code for causing the at least one computer to transmit a handover message to the base station indicating whether the handover event corresponds to an early handover event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
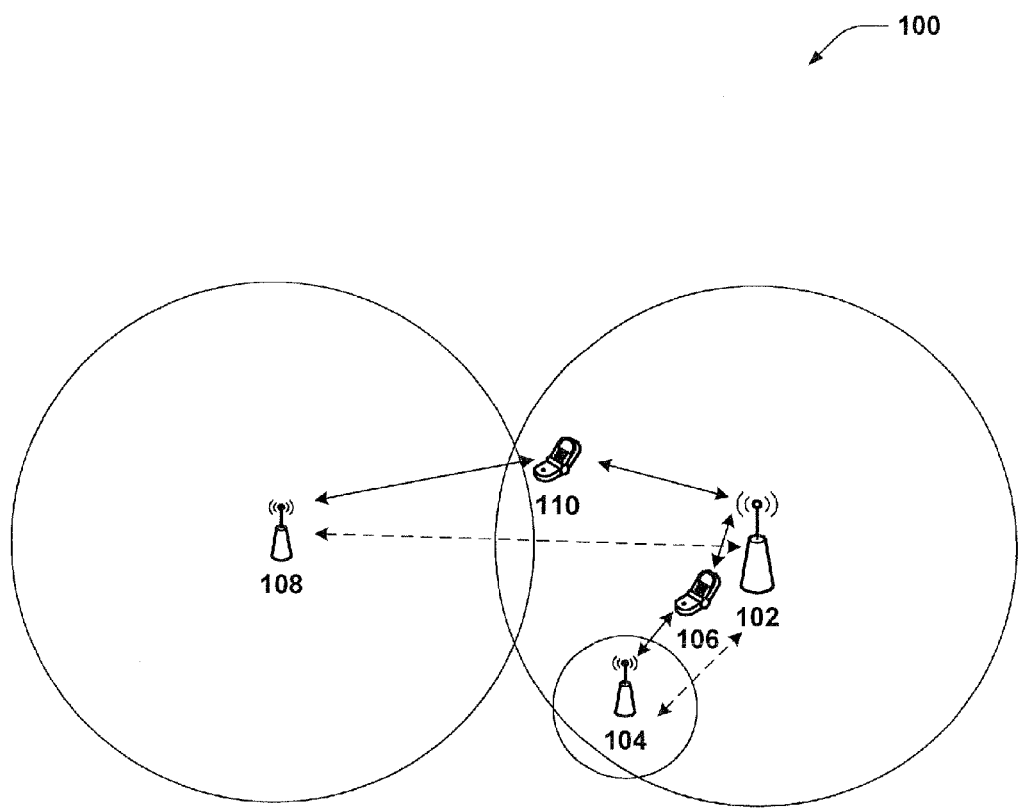
FIG. 1 is a block diagram of an aspect of a system including devices communicating with low power base stations and macrocell base stations.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to interference mitigation for devices in wireless networks including low power base stations and macrocell base stations. A low power base station can be referred to herein as a femto node, pico node, micro node, or similar base station. In particular, handover events related to a device can be detected, and a set of protected resources can be assigned to the device to mitigate interference over the set of resources. For example, a device can be handed over from a macrocell base station to a femto node, though the macrocell base station has a more desirable signal quality than the femto node. This can be referred to as an early handover event. In this example, the femto node can assign resources to the device that are negotiated with the macrocell base station such to mitigate interference thereover. The resources can be referred to herein as protected resources, interference cancelled resources, inter-cell interference coordination (ICIC) resources, enhanced ICIC (eICIC) resources, and/or the like.

In a similar example, a device communicating with a femto node can be delayed in handing over to the macrocell base station though a signal quality difference between the macrocell base station and the femto node is over a threshold typically indicative of handover. For example, the threshold can be adjusted and/or another higher threshold can be set for actually handing the device over to the macrocell base station. When the signal quality difference reaches the threshold typically indicative of handover, this can indicate entry into a late handover event, and the femto node can similarly assign protected resources to the device for communicating therewith until the higher threshold is reached (and/or until exiting of the late handover event is detected). In one example, existing event thresholds in wireless standards can be used to determine when early and/or late handover events are triggered (e.g., event A3, A2 or A4, etc., in 3GPP LTE). In another example, a new event can be defined for this purpose.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example system 100 for providing mobility and/or interference mitigation among base stations in a wireless network having various classes of power. System 100 can be a heterogeneously-deployed wireless network including base station 102, which can be a macrocell base station or similar base station (e.g., eNB) in a first power class, and base station 104, which can be a low power base station such as a femto node, pico node, micro node, etc., in a second power class that is lower than the first power class. The network can further include a device 106 (e.g., UE) that communicates with base stations 102 and/or 104, and a base station 108, which can similarly be a macrocell base station. The system 100 also includes a device 110 that can communicate with base stations 102 and/or 108. In addition, base station 102 can communicate with base station 104 and/or 108 over a wired or wireless backhaul connection (e.g., using an X2 interface in an LTE configuration).

Generally, device 110 can communicate with base station 102 and can move towards base station 108. Once device 110 is within cell coverage of base station 108, base station 102 can handover the device 110 (e.g., in idle or active mode) to base station 108 based on detecting one or more events from measurement reports received from the device 110. For example, the one or more events can correspond to detecting that a signal quality measurement of base station 108 is over a threshold difference from that of base station 102. Where a femto node 104 operates within a cell provided by a base station 102, mobility procedures can be modified as the above events may not adequately achieve desired communications for device 106.

For example, with conventional mobility procedures the closer femto node 104 is to base station 102, the device 106 may need to be closer to femto node 104, or at least further from base station 102 (e.g., closer to the cell edge), to be handed over to femto node 104. In this regard, thresholds for the one or more events can be modified to allow the device 106 to be handed over to femto node 104 sooner (e.g., where a difference in power between base station 102 and femto node 104 is larger), which can be referred to herein as an early handover event. Similarly, where device is communicating with femto node 104, the one or more events can be modified to allow the device 106 to continue communicating with femto node 104 longer (e.g., where a difference in power between femto node 104 and base station is larger) before handing over to base station 102; the time during which the difference in power is more than an original threshold and less than the modified threshold can be referred to herein as a late handover event. Thus, entry into the late handover event can occur when the difference in power is at an original threshold for causing handover. This can be beneficial, for example, where device 106 is within close proximity to base station 102.

Where device 106 is further from the base station 102 (e.g., closer to the cell edge), the thresholds for the one or more events may not be modified, or may be modified more slightly than where the device 106 is closer to base station 102. Thus, where the thresholds are modified drastically, device 106 has more of a chance of being interfered by communications from base station 102 (e.g., since device 106 is closer to base station 102 and experiences higher power therefrom). In this case, upon handover of device 106 from base station 102 to femto node 104, for example, femto node 104 can assign a set of protected resources to device 106 for communicating with femto node 104. The set of protected resources can correspond to resources negotiated between the base station 102 and femto node 104 in ICIC, eICIC, or other interference cancellation schemes. Thus, where device 106 is close to base station 102, it can avoid interference therefrom by being assigned resources not utilized by base station 102 for communicating with femto node 104. In this example, femto node 104 can receive an indication (e.g., from base station 102 or otherwise) as to whether device 106 is early handed over to femto node 104 (e.g., whether the one or more thresholds are modified at base station 102 to perform early handover), the degree to which the one or more threshold are modified, etc., and femto node 104 can accordingly assign the protected resources to device 106.

In a similar example, where device 106 is handed over from femto node 104 to base station 102 (e.g., in late handover), femto node 104 can assign a set of protected resources to device 106 at least where the signal quality of base station 102 reported by device is under the threshold difference from that of femto node 104 for a late handover event and over a second threshold difference (e.g., the original difference for causing handover, or another defined threshold). Similarly, in this regard, device 106 can be protected from interference of base station 102. In one example, as described further herein, standardized events (e.g., event A3, A2, A4, etc., in LTE) can be used/modified to accomplish such functionality. In other examples, new events can additionally or alternatively be defined. Moreover, though low power base station 104 is referred to as a femto node 104, it is to be appreciated that low power base station 104 can be substantially any eNB, such as a macrocell base station, a pico node, a micro node, a home NB or home eNB (H(e)NB), etc.

Figure 2:
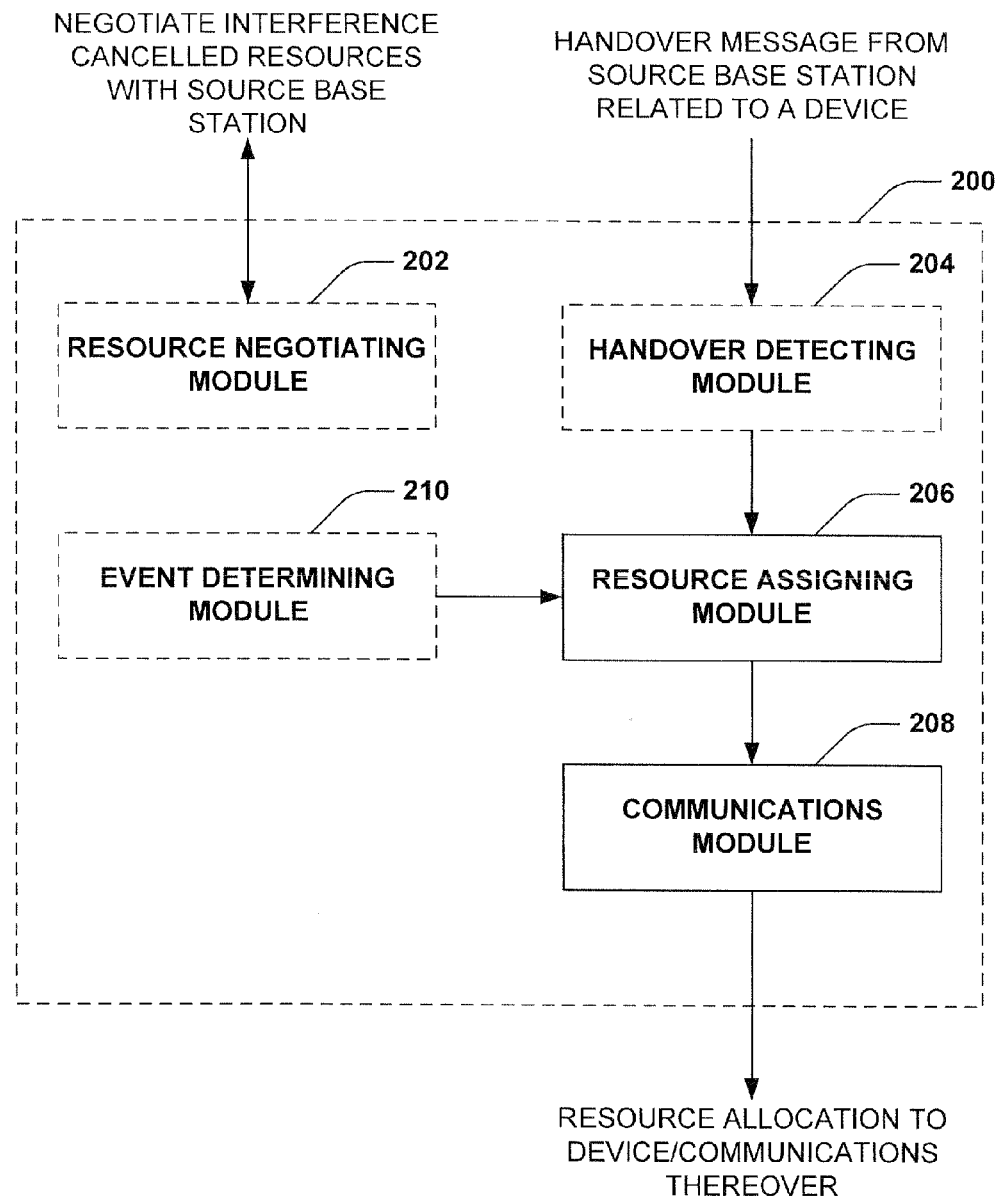
FIG. 2 is a block diagram of an aspect of a system for assigning resources to a device based on a handover event.

FIG. 2 illustrates an example apparatus 200 for mitigating interference in certain mobility procedures. Apparatus 200 can be a femto node (e.g., femto node 104) or other low power base station that can communicate with one or more devices to provide wireless network access thereto, and can include additional modules than those depicted. Apparatus 200 can optionally include a resource negotiating module 202 for negotiating resources with one or more base stations and/or a handover detecting module 204 for determining a device is to be handed over to apparatus 200. Apparatus 200 can also include a resource assigning module 206 for allocating resources to the device to facilitate handover, and a communications module 208 for communicating the resource allocation to the device and/or communicating therewith over the resource allocation. Apparatus 200 can also optionally include an event determining module 210 for determining occurrence of one or more events related to handing over device to another base station.

According to an example, resource negotiating module 202 can negotiate interference cancelled resources with a source base station. For example, this can include negotiating the resources using ICIC, eICIC, or similar interference cancellation mechanisms such that the resource negotiating module 202 can receive at least a set of protected resources over which the source base station does not communicate with one or more devices to ensure the resources are protected from interference by the source base station. In one example, the protected resources can be time division multiplexing (TDM) resources assigned to apparatus 200. It is to be appreciated that resource negotiating module 202 can negotiate such resources with additional base stations, which can include macrocell base stations, other femto nodes or low power base stations, and/or the like.

Further, in an example, handover detecting module 204 can receive a handover message from a source base station related to a device. The handover message can include information to prepare apparatus 200 for the handover. In addition, the handover message can include an indication of whether the device is being handed over early to apparatus 200 (e.g., whether a signal quality of the source base station is over a threshold difference from that of apparatus 200 at the device). In another example, the handover message can include the difference in signal quality as reported by the device. Based on this information, the resource assigning module 206 can determine whether to assign protected resources to the device.

For example, where the device is being handed over early from the source base station and/or where an indicated signal quality difference is over a threshold, resource assigning module 206 can assign at least a portion of protected resources to the device for communicating with apparatus 200. The protected resources can be a portion of those negotiated by resource negotiating module 202, a portion of a set of preconfigured protected resources known by the apparatus 200 and/or source base station, and/or the like. Where the device is not being handed over early and/or the indicated signal quality difference is not over the threshold, resource assigning module 206 can assign non-protected resources to the device to reserve the protected resources for early handover devices, for instance. In addition, where the apparatus 200 and source base station use a similar transmit power, resource assigning module 206 can also assign protected resources for uplink communications from the device that do not interfere with the serving base station to protect the serving base station from interference by the device.

In any case, communications module 208 can communicate the resource allocation to the device and/or communicate over the resource allocation to the device. Thus, in some cases, the device can be assigned protected resources where interference from the source base station may be present. In another example, where the device is communicating with apparatus 200, event determining module 210 can determine that a late handover event is triggered based on a signal quality of another base station. In this example, resource assigning module 206 can similarly assign protected resources to the device at least until another actual handover event is triggered with a higher signal quality difference threshold (e.g., to keep device communications with apparatus 200 for a longer period of time, as described), until exiting of the late handover event is detected (e.g., based on the handover detecting module 204 detecting the signal quality difference is below the threshold), etc.

Figure 3:
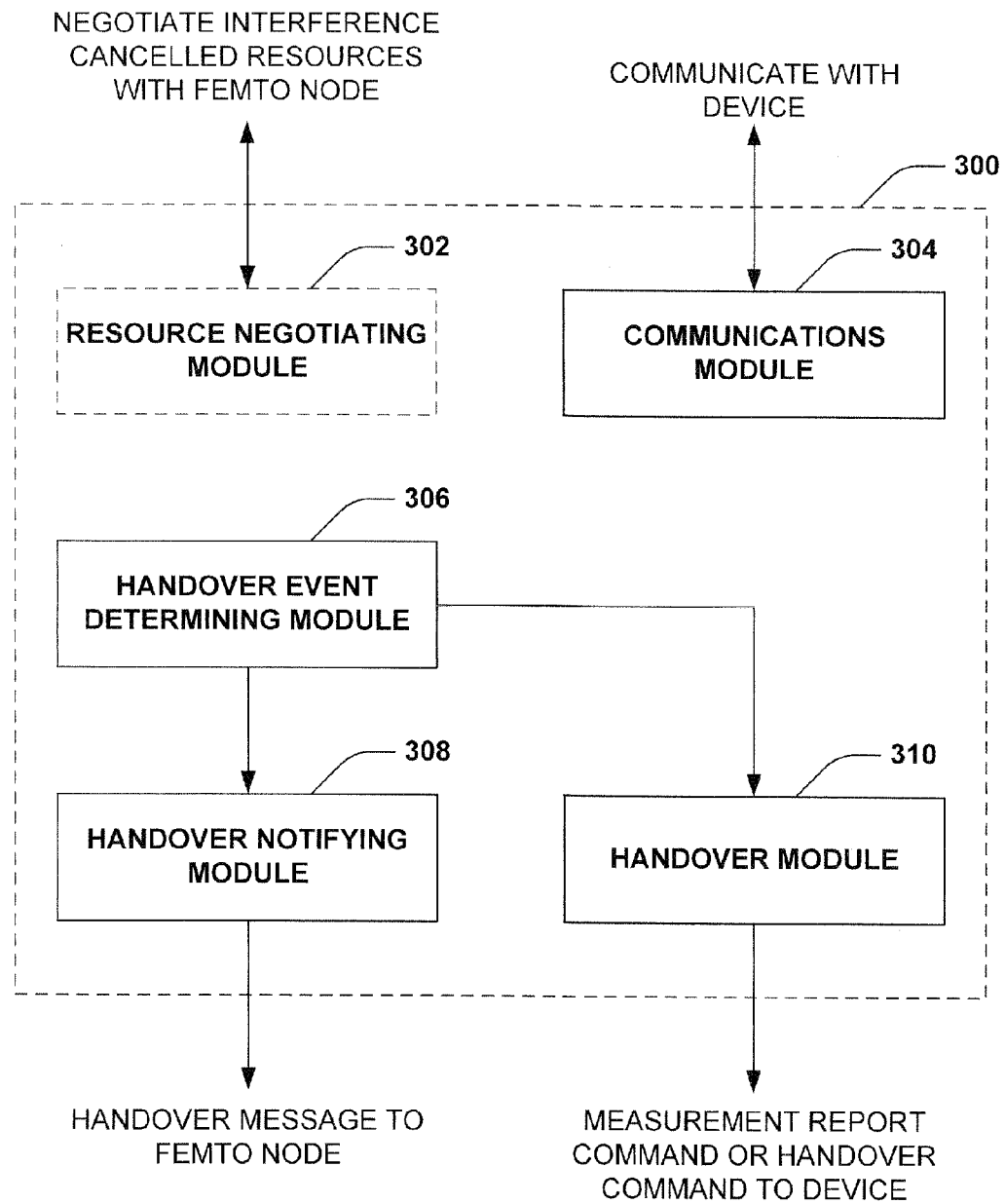
FIG. 3 is a block diagram of an aspect of a system for communicating a handover event for a device to a femto node.

FIG. 3 illustrates an example apparatus 300 for mitigating interference in certain mobility procedures. Apparatus 300 can be a macrocell base station (e.g., base station 102) or other high power base station that can communicate with one or more devices to provide wireless network access thereto, and can include additional modules than those depicted. Apparatus 300 can optionally include a resource negotiating module 302 for negotiating resources with one or more femto nodes or other base stations. Apparatus 300 can also include a communications module 304 for communicating with a device, and a handover event determining module 306 for detecting a handover event for the device. In addition, apparatus 300 includes a handover notifying module 308 for communicating a handover message to a femto node based on the handover event, and a handover module 310 for communicating a handover command to the device to facilitate handing over the device to the femto node.

According to an example, resource negotiating module 302 can negotiate resources with the femto node using ICIC, eICIC, etc. to obtain a set of resources over which the femto node does not communicate, and/or provide a set of resources over which apparatus 300 does not communicate. Communications module 304 can communicate with a device over an assigned set of communications resources. Handover event determining module 306 can detect a handover-related event for the device, which can include determining a signal quality of a nearby femto node is at least at a threshold difference to that of apparatus 300 at the device. For example, this can be based on a threshold difference that triggers handover and/or a modified threshold difference, as described.

In this example, handover notifying module 308 can send a handover message to the femto node to prepare the femto node for the handover. The handover message, in one example, can include an indication that the handover is an early handover, as described, and/or an indication of the difference in signal quality between the femto node and apparatus 300 at the device. The femto node can use this information for determining whether to assign protected resources to the device, as described above. In addition, in response to determining the handover event, handover module 310 can command the device to handover communications to the femto node.

In a specific example, in LTE, base stations can detect an event A3 related to a device in which a neighbor cell has a signal quality that is better than that of the serving base station, or a cell thereof, at the device by an offset. According to 3GPP TS 36.331 Version 9.3.0, for example, the entering condition for the event A3 can occur when $$Mn+Ofn+Ocn-Hys>Ms+Ofs+Ocs+Off$$

where Mn is the measurement result of the neighbor cell, Ofn is the frequency specific offset of the frequency of the neighbor cell, Ocn is the cell specific offset of the neighbor cell, Hys is a hysteresis parameter for the event (e.g., to prevent ping-ponging handover between base stations), Ms is the measurement result of the serving cell, Ofs is the frequency specific offset of the serving frequency, Ocs is the cell specific offset of the serving cell, and Off is an offset parameter for the event.

Thus, handover event determining module 306 can configure a different offset for causing handover at the apparatus 300 by adjusting the Ocs, Ocn, and/or Off parameters. Referring to FIG. 1, for example, let Ocs of base station 102 be 0 decibels (dB), Ocn of base station 108 can be 0 dB and Ocn of femto node 104 can be set to 15 dB. In this example, event A3 are triggered for devices 110 and 106 at different Ms and Mn offset. On the other hand, multiple A3 events can be configured for a device with different Off values. For example, two events A3 could be configured for device 106, one with Off of 3 dB and a second one with Off of 15 dB. In this case, two events A3 can be triggered when device 106 moves from base station 102 to femto node 104. The event A3 is usually configured to trigger handover where signal quality, X dB (X>0), is above that of the serving cell for a duration of T seconds. In a homogenous network, a typical handover threshold of 3 dB can be configured between macrocell base station 102 and macrocell base station 108.

In one example, in a heterogeneous network the event A3 may also be configured to trigger resource partitioning without a handover, an early handover event with interference protection from the serving cell, a late handover event with interference protection from the neighbor cell, etc. For example, to extend the range of the femto node 104, the base station 102 can configure the event A3 to trigger an early handover from the base station 102 to the femto node 104 and/or a late handover from the femto node 104 to the base station 102 with interference protection from the base station 102, as described. In addition, to mitigate interference, the base station 102 and/or femto node 104 can configure the event A3 to trigger resource partitioning between the base station 102 and the femto node 104 regardless of whether handover actually occurs.

In example configurations, referring to FIG. 2 and FIG. 3, handover event determining module 306 can configure a negative event A3 threshold with a very low threshold such when entering the event A3, Mn−Ms<0 dB. For example, handover event determining module 306 can adjust the event A3 threshold to trigger when Mn−Ms>−15 dB. In such a configuration, the event A3 is entered when the signal quality difference between the measurement result Mn of the neighbor cell (e.g., a cell provided by apparatus 200) and the measurement result Ms of the serving cell (e.g., a cell provided by apparatus 300) is at or around −15 dB. In one example, the adjusted threshold can be below a radio link failure threshold (e.g., approximately −10 dB in LTE). In this regard, handover event determining module 306 can trigger event A3 when the neighbor cell is much weaker than the serving cell, such that early handover can be ineffective without interference mitigation.

An indication of early handover can be communicated by the handover notifying module 308 to apparatus 200 over a backhaul connection, and handover detecting module 204 can receive the indication. In this regard, resource assigning module 206 can assign a set of protected resources to the device for communicating therewith. The indication can be an explicit indication of early handover, and/or can include signal quality measurements Mn, Ms, etc., along with related cell identifiers from which an early handover event can be determined, etc. For example, this can include a signal quality measurement from a strongest cell on a given frequency, along with the corresponding cell identifier, from which handover detecting module 204 can discern an early handover (e.g., based on the signal quality measurement as compared to that of apparatus 200). In one specific example, the indication can be in an explicit message from handover notifying module 308, which can be a message typically used in carrier aggregation to report measurement of one or more base stations. The message can have a format similar to the following specific data structure in LTE:

```
RRM-Config ::=     SEQUENCE {
    ue-InactiveTime    ENUMERATED {
        s1, s2, s3, s5, s7, s10, s15, s20,
        s25, s30, s40, s50, min1, min1s20c, min1s40,
        min2, min2s30, min3, min3s30, min4, min5, min6,
        min7, min8, min9, min10, min12, min14, min17, min20,
        min24, min28, min33, min38, min44, min50, hr1,
```

```
            hr1min30, hr2, hr2min30, hr3, hr3min30, hr4, hr5, hr6,
            hr8, hr10, hr13, hr16, hr20, day1, day1hr12, day2,
            day2hr12, day3, day4, day5, day7, day10, day14, day19,
            day24, day30, dayMoreThan30} OPTIONAL,
        ...,
        [[ candidateCellInfoList-r10 CandidateCellInfoList-r10 OPTIONAL
        ]]
}
CandidateCellInfoList-r10 ::= SEQUENCE (SIZE (1..maxFreq)) OF
CandidateCellInfor10
CandidateCellInfo-r10 ::=    SEQUENCE {
    -- cellIdentification
    physCellId-r10        PhysCellId,
    dl-CarrierFreq-r10      ARFCN-ValueEUTRA,
    -- available measurement results
    rsrpResult-r10     RSRP-Range   OPTIONAL,
    rsrqResult-r10     RSRQ-Range   OPTIONAL,
    ...
}
```

In this example, the rsrpResult-r10 and rsrqResult-r10 can specify certain values that indicate an early handover, and thus handover detecting module 204 can receive this structure, and determine early handover based in part on the values, on comparing the values to thresholds, etc. For instance, handover detecting module 204 can compare a rsrpResult-r10 and/or rsrpResult-r10 of apparatus 300 (which provides the serving cell in this example) to that of apparatus 200 (which provides the neighbor cell in this example). Related cell identifiers, such as the physCellId-r10, can be used to differentiate measurements of apparatus 300 from those of apparatus 200 and/or other measurements, for example. Handover detecting module 204 can determine the strongest measurement, which can be that of apparatus 300 in this example. Thus, where the signal quality measurements for apparatus 300 are greater than those for apparatus 200, this can indicate an early handover to the neighbor cell.

A device, as generally described in reference to FIG. 2 and/or FIG. 3 can refer to a device 106, for example. Similarly, apparatus 200 can refer to a femto node 104, and apparatus 300 can refer to a base station 102, and both can be referred to as a serving or neighbor cell in various examples presented below. For example, both the data and the control downlink resources can be protected at the neighbor cell for the device upon early handover. In one example, TDM of the resources can be used to negotiate interference cancelled protected resources. If the serving cell and the neighbor cell have similar transmit power, resource assigning module 206 can assign protected resources for uplink communications as well based on a detected early or late handover event.

In another configuration, where the device is communicating with a serving cell of apparatus 200 and considering handover to a neighbor cell of apparatus 300, the event determining module 210 can configure a high event A3 threshold such that the event A3 condition triggers when Mn−Ms−0 dB (e.g., Mn−Ms is greater than 4 dB or Mn−Ms is greater than 8 dB to 10 dB). For example, event determining module 210 can trigger the event A3 condition when Mn−Ms>15 dB. In this case, the neighbor cell is stronger than the serving cell. To maintain the reliability of the link between the device and the serving cell before a late handover event, resource assigning module 206 can similarly configure the device with protected resources that experience no or at least a lower level of interference from the neighbor cell.

In this example, both the data and the control downlink resources can be protected for the device for communications from apparatus 200. TDM of the resources is one example of resource protection. If the serving cell and the neighbor cell have similar transmit power, resource assigning module 206 can assign protected resources to the device to protect the uplink resources at the neighbor cell from interference from the devices served by apparatus 200 in the serving cell. If the serving cell has a much lower transmit power than the neighbor cell, resource assigning module 206 can assign protected uplink resources to the device to protect the uplink resources at apparatus 200 from interference by devices served by the neighbor cell, since the late handover event can occur when the devices are close to the serving cell.

In other examples, handover event determining module 306 can configure event A2 and/or event A4 defined for LTE mobility to modify behavior of event A3. For example, handover event determining module 306 can prevent the handover with interference protection/mitigation upon the event A2 in which the signal quality of the serving cell (e.g., a cell of apparatus 300) is below a threshold (condition: Ms+Hys<Thresh) and/or the event A4 in which the signal quality of a neighbor cell (e.g., a cell of apparatus 200) is above a neighbor threshold (condition: Mn+Ofn+Ocn−Hys>Thresh). Where a device is limited by thermal and/or ambient interference, for example, removing the dominant interference may not lead to a substantial gain in the signal to interference plus noise ratio (SINR). In the case of handover, where handover event determining module 306 determines the serving cell is below an absolute threshold (e.g., 3 dB compared to thermal), handover to a weaker cell in range expansion may not be triggered.

For example, if the event A2 is triggered when Ms<3 dB, and then the event A3 is triggered when Mn−Ms>−15 dB, handover event determining module 306 can avoid performing an early handover of the device from the serving cell to the neighbor cell, as the measurement result Mn of the neighbor cell is less than the neighbor threshold (e.g., −12 dB). In another example, where handover event determining module 306 does not detect triggering of event A4 (e.g., the measurement result Mn is −8 dB where event A4 is triggered with Mn>−5 dB), and then the event A3 is triggered when Mn−Ms>−15 dB, handover event determining module 306 can avoid performing an early handover of the device from the serving cell to the neighbor cell. In both of these examples, it can be expected that the downlink SINR at the neighbor cell after handover may be thermally limited even without interference from the serving cell.

Similarly, when the serving cell, which can be provided by apparatus 200 in this example, is below an absolute threshold (e.g., −6 dB compared to thermal), event determining module 210 may not trigger handover for range expansion against a stronger neighbor cell. For example, if the event A2 is triggered when Ms<−6 dB, and then the event A3 is triggered when Mn−Ms>15 dB, event determining module 210 may trigger the events, though the events may not result in a late handover of the device from the serving cell to the neighbor cell, as −6 dB can be close to radio link failure, the neighbor cell has sufficient signal strength, and therefore the serving cell can handover the device to the neighbor cell without holding onto the device for a late handover to the neighbor cell. For another example, if event determining module 210 determines triggering of event A4 (e.g., Mn>−9 dB), and then of event A3 when Mn−Ms>15 dB, the triggering of the events should not result in a late handover of the device from the serving cell to the neighbor cell, as −6 dB can be close to radio link failure, the neighbor cell has sufficient signal strength, and therefore the serving cell can handover the device to the neighbor cell without holding onto the device for a late handover thereto.

In yet another example, handover event determining module 306 can configure a new event for determining mobility and/or interference management conditions based on a comparison of the measurement result of a neighbor cell relative to the sum of interference from cells other than the serving cell. Moreover, handover event determining module 306 can use such events to trigger measurement reporting from the device (e.g., through a request from handover module 310). For example, where a received signal strength indicator (RSSI) represents the total received power over the measurement bandwidth on reference signal (RS) symbols, and a RS received power (RSRP) represents the received RS power from a cell over the measurement bandwidth on RS symbols, a value $\Delta x$ can be defined as follows:

$$\Delta x = RSRP\_x/(RSSI-RSRP\_serving*N)$$

where RSRP_x is the RS power for cell x, RSRP_serving is the RS power for the serving cell, and N is an estimated data and pilot to pilot power ratio. The minimum and maximum value of N can be 1 and 3, respectively, for a system that utilizes 2 transmitters. For example, the estimate can be derived from the network or by the device. Using the minimum and maximum value for N can be plausible in many scenarios.

An alternative metric is to compare the strongest neighbor with the second strongest neighbor. As such, the metric $\Delta x$ can be defined as RSRP_1/RSRP_2, where RSRP_1 is the RSRP of the strongest neighbor, and RSRP_2 is the RSRP of the second strongest neighbor. Where the strongest neighbor is sufficiently higher than the second strongest neighbor, it is likely that the received power from the neighbor is significant compared to the total ambient interference plus thermal. In any case, based on the new metric $\Delta x$, handover module 310 can trigger a measurement report at the device if $\Delta x$ goes above a first threshold T1 (e.g., with entering condition $\Delta x$>T1) or if $\Delta x$ goes below a second threshold T2 (e.g., with exiting condition $\Delta x$<T2). Upon receiving the measurement report, handover event determining module 306 can determine whether a handover or interference mitigation event is triggered, as described. In addition, based on comparing $\Delta x$ to a threshold, the resource negotiating module 302 can trigger resource partitioning with a neighbor cell if the neighbor cell becomes strong compared to the ambient interference.

For intra-frequency measurement, a device can arbitrarily sample the subframes to measure as long as the performance requirement is satisfied. In a heterogeneous network with TDM partitioning, the measurement quality over subframes can vary. For RS received power (RSRP), in the case of colliding RS, the RSRP measurement of a weaker cell is likely to be consistent over all subframes. In the case of non-colliding RS, the RSRP measurement of a weaker cell is likely to be time varying over subframes. The RS received quality (RSRQ) can be defined as RSRP/RSSI. RSSI can be time varying cross subframes depending on traffic load. The RSRQ measurement hence has the variability of both RSRP and traffic load.

In this example, handover module 310 can configure the device to report measurements of other cells such that variability of the measurements is taken into account. For example, if it is desirable to be conservative and keep legacy device out of the range expansion region, handover module 310 can configure the device to generate measurement reports over colliding RSs where the signal quality of the neighbor cell can be less given interference from the serving call. If it is desirable to keep legacy devices on the protected resources, handover module 310 can configure the device to generate measurement reports over non-colliding RSs where the device can experience a strong signal from the neighbor cell.

Moreover, a noisy RSRP measurement of the serving cell under high interference may have a positive bias. Averaging of clean and noise RSRP measurements over time can also have a positive bias. As such, handover event determining module 306 can remove the bias when reporting from legacy device is received to determine whether a handover event is triggered. Handover event determining module 306 can additionally, in one example, analyze fluctuation of measurements to apply a larger Hys value when the measurement report varies.

FIGS. 4-7 illustrate example methodologies relating to mitigating interference in wireless communications. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
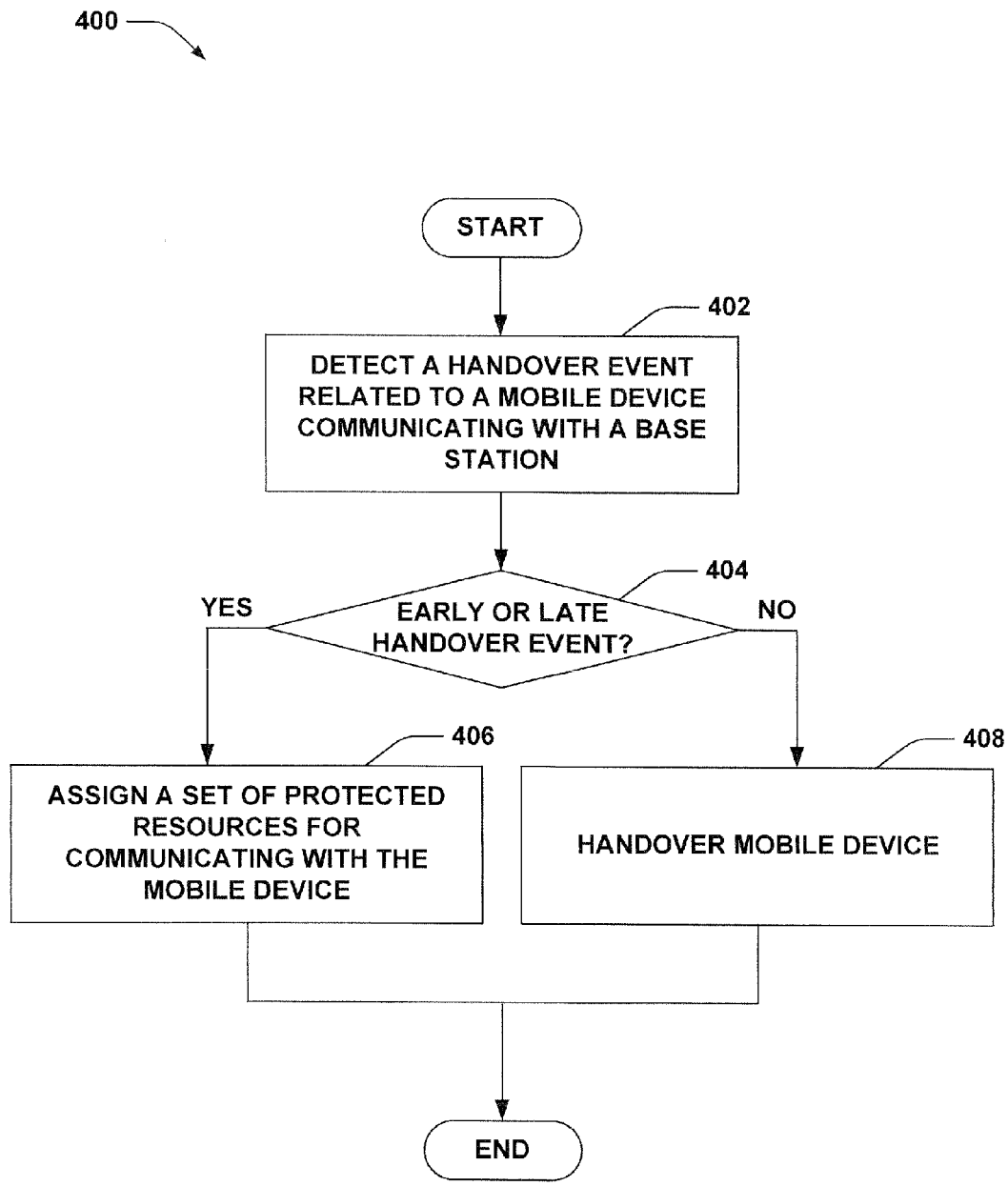
FIG. 4 is a flow chart of an aspect of a methodology for assigning protected or non-protected resources to a device.

FIG. 4 depicts an example methodology 400 for mitigating interference in device mobility.

At 402, a handover event related to a mobile device communicating with a base station can be detected. In one example, the handover event can be a LTE event, such as event A3, A2, A4, and/or other events in other wireless network technologies, a new event, etc. The handover event can be detected based in part on determining occurrence of the event, which can be based on monitoring one or more parameters, receiving an indication of occurrence of the event, etc. In one example, the handover event can be determined based on monitoring a signal quality measurement of a serving base station and comparing the measurement, or a difference between the measurement and that of another base station, to one or more thresholds. In another example, the handover event can be determined by receiving an indication of the event from a serving base station.

At 404, it can be determined whether the handover event is an early or late handover event. The thresholds related to entry of the handover event can be adjusted to cause an early or late handover. Thus, detecting whether the handover event is early or late can comprise comparing a signal quality difference with the serving base station received from the mobile device to a modified threshold, receiving a notification from the serving base station that a handover is an early or late handover, and/or the like.

If the handover is an early or late handover, at 406 a set of protected resources can be assigned for communicating with the mobile device. The protected resources can be a subset of those previously negotiated with the serving base station. For example, the set of protected resources can be allocated for the mobile device, and an indication of assignment can be communicated to the mobile device (e.g., in a control message over a control channel, such as a physical downlink control channel (PDCCH) in LTE).

If the handover event is not an early or late handover event, at 408 the mobile device can be handed over. For example, where the handover event is received from the serving base station, this can include receiving handover of the mobile device, and can include assigning resources to the mobile device. For example, the resources, in this example, can be selected from a set of resources other than the protected resources. In another example, where the handover event is detected based on one or more measurements, handing over the mobile device at 408 can include handing over the mobile device to another base station.

Figure 5:
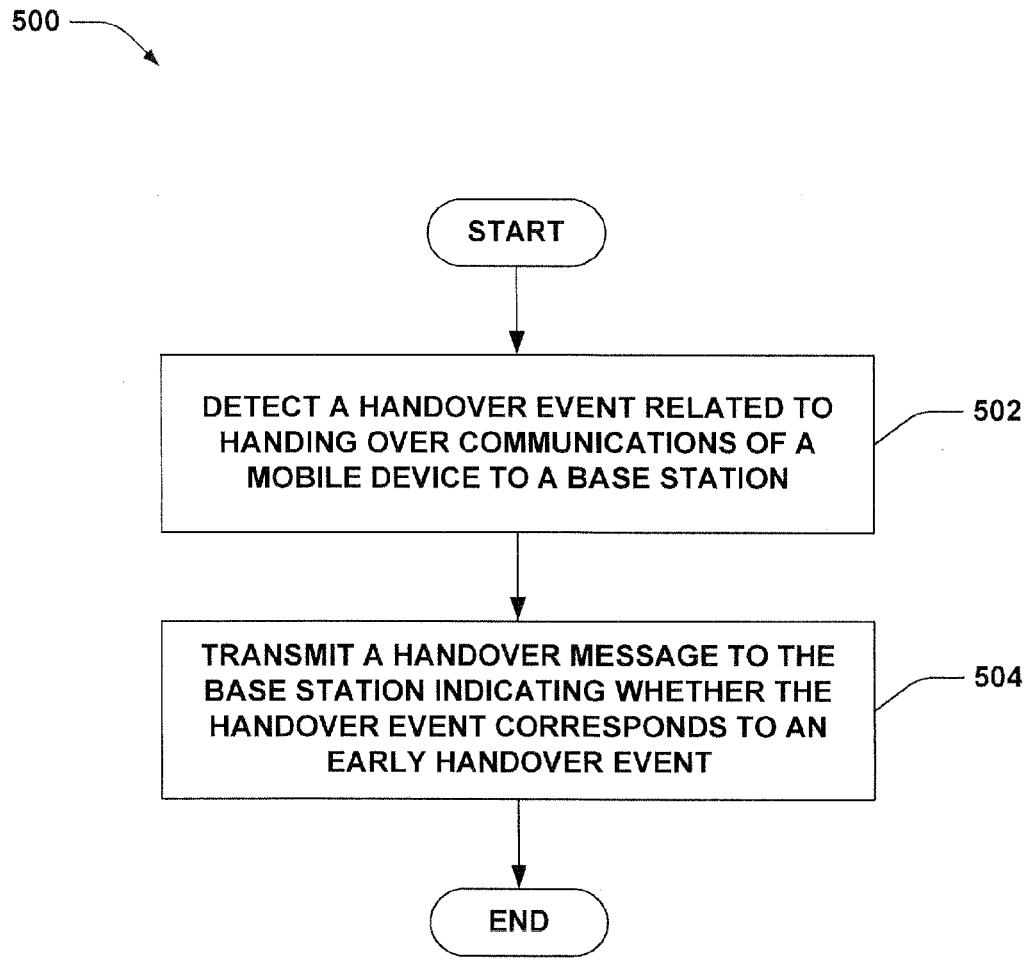
FIG. 5 is a flow chart of an aspect of a methodology for transmitting a handover message to a base station.

FIG. 5 illustrates an example methodology 500 for indicating whether a handover is an early handover.

At 502, a handover event related to handing over communications of a mobile device to a base station can be detected. For example, the event can correspond to an event A3, A2, A4, etc. in LTE or other events in other wireless network technologies, a new event, etc. In an example, thresholds related to the handover can be adjusted for performing early handover of some mobile devices. In this regard, a signal quality reported by the mobile device can be compared to a signal quality of the base station, and the difference can be compared to a modified threshold for entering event A3 to determine whether to perform early handover of the mobile device. In addition, the base station can be a low power base station, such as a femto node, pico node, micro node, or substantially any eNB or H(e)NB, for example.

At 504, a handover message can be transmitted to the base station indicating whether the handover event corresponds to an early handover event. In one example, the handover message can include the difference between the measured signal qualities; in another example, the handover event can comprise an explicit indication of early handover. The base station can utilize this information to assign a set of protected resources, protected from interference, to the mobile device for communicating therewith.

Figure 6:
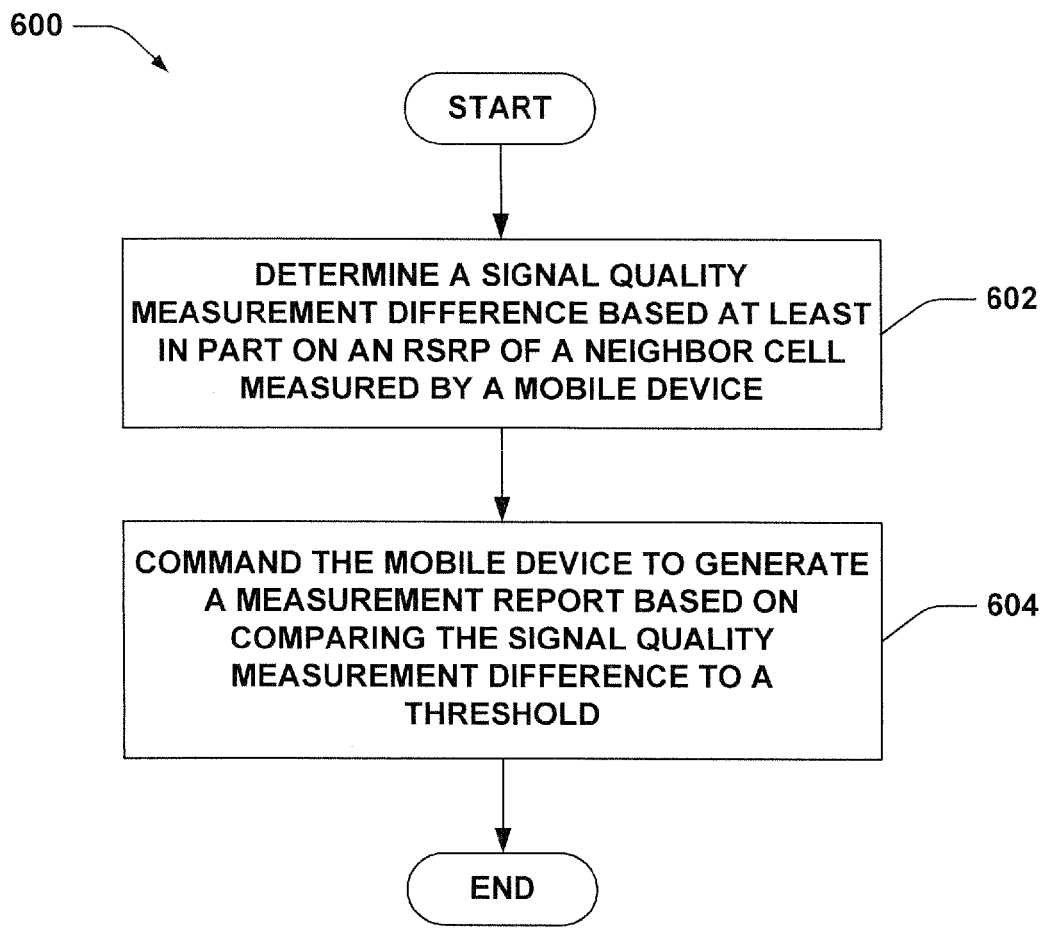
FIG. 6 is a flow chart of an aspect of a methodology for commanding a device to generate a measurement report.

FIG. 6 shows an example methodology 600 for instructing a mobile device to generate a measurement report.

At 602, a signal quality measurement difference can be determined based on an RSRP of a neighbor cell measured by a mobile device. For example, the signal quality measurement difference can further be based on an RSRP of another neighbor cell, an RSSI experienced at a serving base station, and/or the like.

At 604, the mobile device can be commanded to generate a measurement report based on comparing the signal quality measurement difference to a threshold. For example, the command can be transmitted to the mobile device along with parameters related to generating the measurement report. For example, the command can include an indication for generating the measurement report when the threshold signal quality measurement difference is above or below one or more thresholds.

Figure 7:
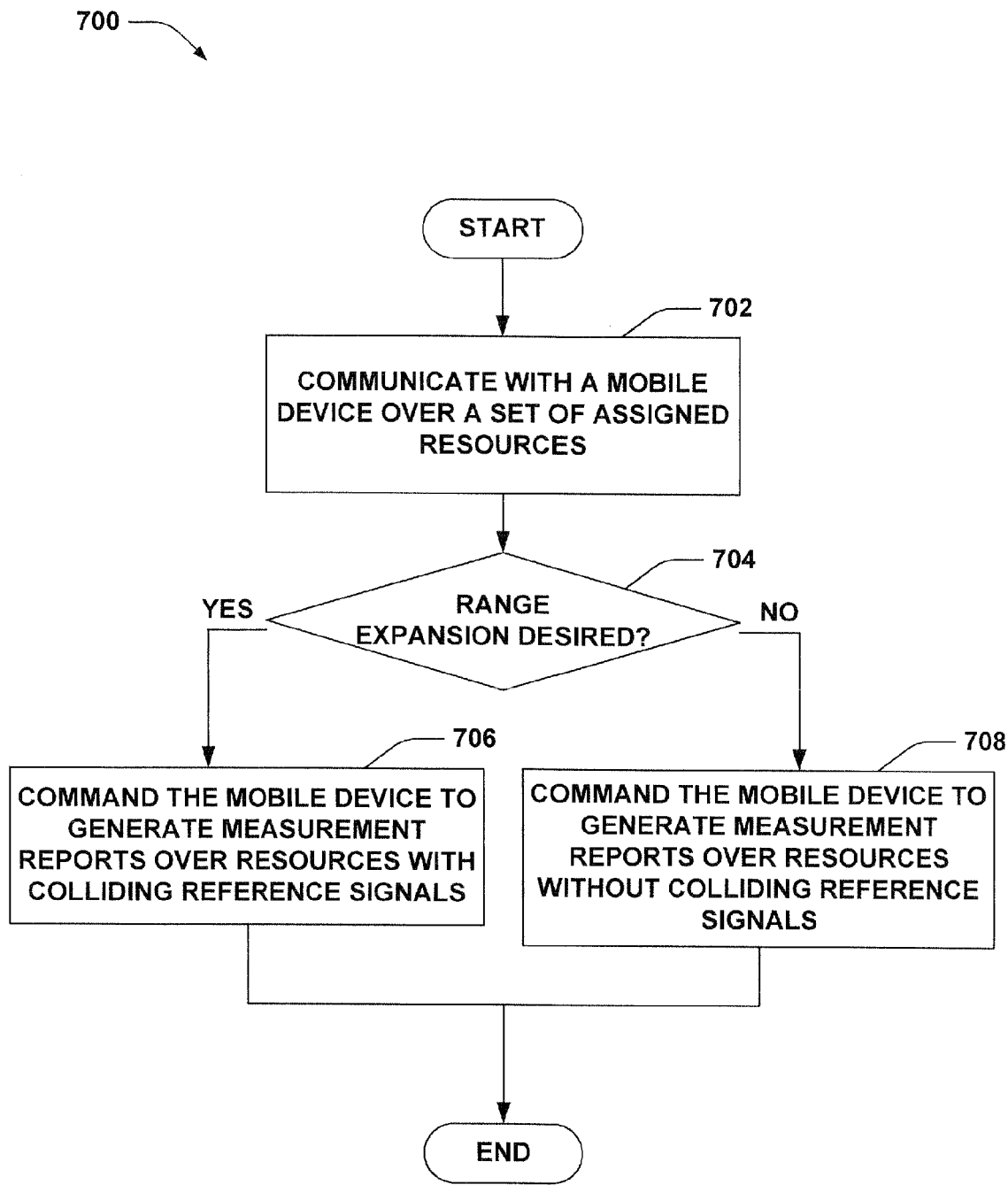
FIG. 7 is a flow chart of an aspect of a methodology for determining resources over which to command a device to generate a measurement report.

FIG. 7 illustrates an example methodology 700 for commanding a mobile device to create measurement reports.

At 702, a mobile device can be communicated with over a set of assigned resources. For example, this can be a set of resources assigned to the mobile device upon receiving an access request therefrom. The resources can be assigned over a PDCCH, in one example.

At 704, it can be determined whether range expansion is desired. For example, this determination can be made based on whether to support range expansion based on a version of a mobile device (e.g., whether the mobile device is a legacy device). In another example, this can be based on a measured load. Thus, where a number of mobile devices are being communicated with, it can be desirable to support range expansion for some mobile devices to allow the mobile devices to additionally or alternatively communicate with a femto node.

If range expansion is desired, at 706 the mobile device can be commanded to generate measurement reports over resources with colliding reference signals. In this regard, measurements of neighbor cells over the resources can be higher than over non-colliding resources. In one example, a specification of resources over which to measure signals can be provided to the mobile device (e.g., over a control channel communication).

If range expansion is not desired, at 708 the mobile device can be commanded to generate measurement reports over resources without colliding reference signals. Thus, measurements of the neighbor cells can be negligible. Similarly, this can include communicating a specification of the resources to the mobile device (e.g., over a control channel communication).

It will be appreciated that, in accordance with one or more aspects described herein, inferences can be made regarding determining whether to assign protected resources to a device to mitigate interference thereto, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
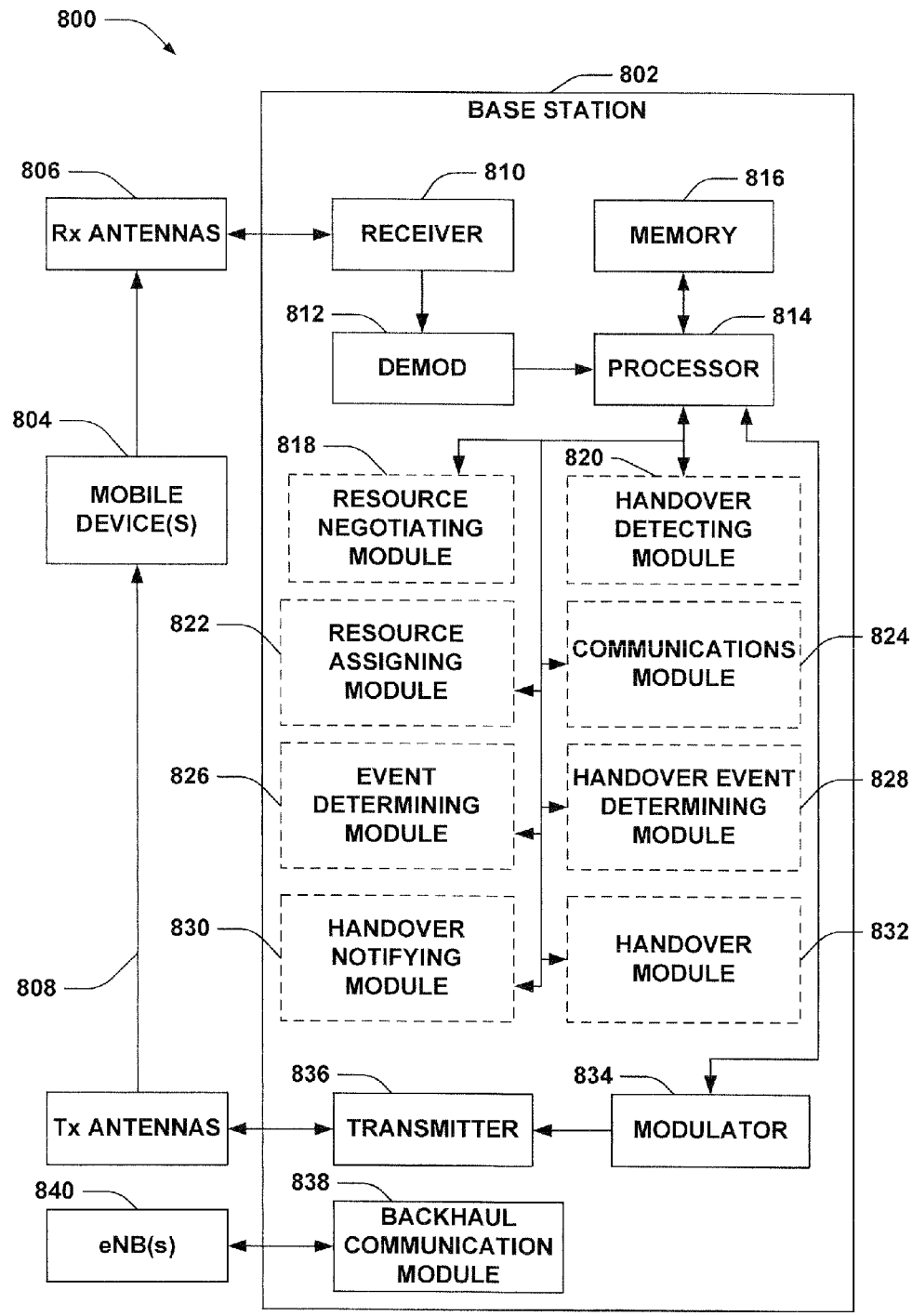
FIG. 8 is a block diagram of a base station in accordance with aspects described herein.

FIG. 8 is an illustration of a system 800 that facilitates mitigating interference among base stations and femto nodes. System 800 includes a base station 802 having a receiver 810 that receives signal(s) from one or more mobile devices or base stations 804 through a plurality of receive antennas 806 (e.g., which can be of multiple network technologies, as described), and a transmitter 836 that transmits to the one or more mobile devices or base stations 804 through a plurality of transmit antennas 808 (e.g., which can be of multiple network technologies, as described). For example, base station 802 can transmit signals received from mobile devices 804 to base stations 804, and/or vice versa. Receiver 810 can receive information from one or more receive antennas 806 and is operatively associated with a demodulator 812 that demodulates received information. In addition, in an example, receiver 810 can receive from a wired backhaul link. Though depicted as separate antennas, it is to be appreciated that at least one of receive antennas 806 and a corresponding one of transmit antennas 808 can be combined as the same antenna. Demodulated symbols are analyzed by a processor 814, which is coupled to a memory 816 that stores information related to performing one or more aspects described herein.

Processor 814, for example, can be a processor dedicated to analyzing information received by receiver 810 and/or generating information for transmission by a transmitter 836, a processor that controls one or more components or modules of base station 802, and/or a processor that analyzes information received by receiver 810, generates information for transmission by transmitter 836, and controls one or more components or modules of base station 802. In addition, processor 814 can perform one or more functions described herein and/or can communicate with components or modules for such a purpose.

Memory 816, as described, is operatively coupled to processor 814 and can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with detecting handover events and/or assigning protected resources to one or more devices.

It will be appreciated that the data store (e.g., memory 816) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to a resource negotiating module 818, which can be similar to resource negotiating modules 202 and/or 302, a handover detecting module 820, which can be similar to handover detecting module 204, a resource assigning module 822, which can be similar to resource assigning module 206, a communications module 824, which can be similar to communications modules 208 and/or 304, an event determining module 826, which can be similar to event determining module 210, a handover event determining module 828, which can be similar handover event determining module 306, a handover notifying module 830, which can be similar to handover notifying module 308, and/or a handover module 832, which can be similar to handover module 310.

Moreover, for example, processor 814 can modulate signals to be transmitted using modulator 834, and transmit modulated signals using transmitter 836. Transmitter 836 can transmit signals to mobile devices or base stations 804 over Tx antennas 808. Furthermore, although depicted as being separate from the processor 814, it is to be appreciated that the resource negotiating module 818, handover detecting module 820, resource assigning module 822, communications module 824, event determining module 826, handover event determining module 828, handover notifying module 830, handover module 832, demodulator 812, and/or modulator 834 can be part of the processor 814 or multiple processors (not shown), and/or stored as instructions in memory 816 for execution by processor 814.

In addition, base station 802 can include a backhaul communication module 838 for communicating with one or more eNBs 840 over a backhaul interface. For example, backhaul communication module 838 can communicate with the eNBs 840 over a wired or wireless backhaul link using one or more backhaul interfaces (e.g., X2 interface in LTE). Where the backhaul link is wireless for example, it is to be appreciated that base station 802 can utilize Rx antennas 806 and receiver 810 to receive communications from eNBs 840, and/or Tx antennas 808 and transmitter 836 to communicate signals to eNBs 840.

Figure 9:
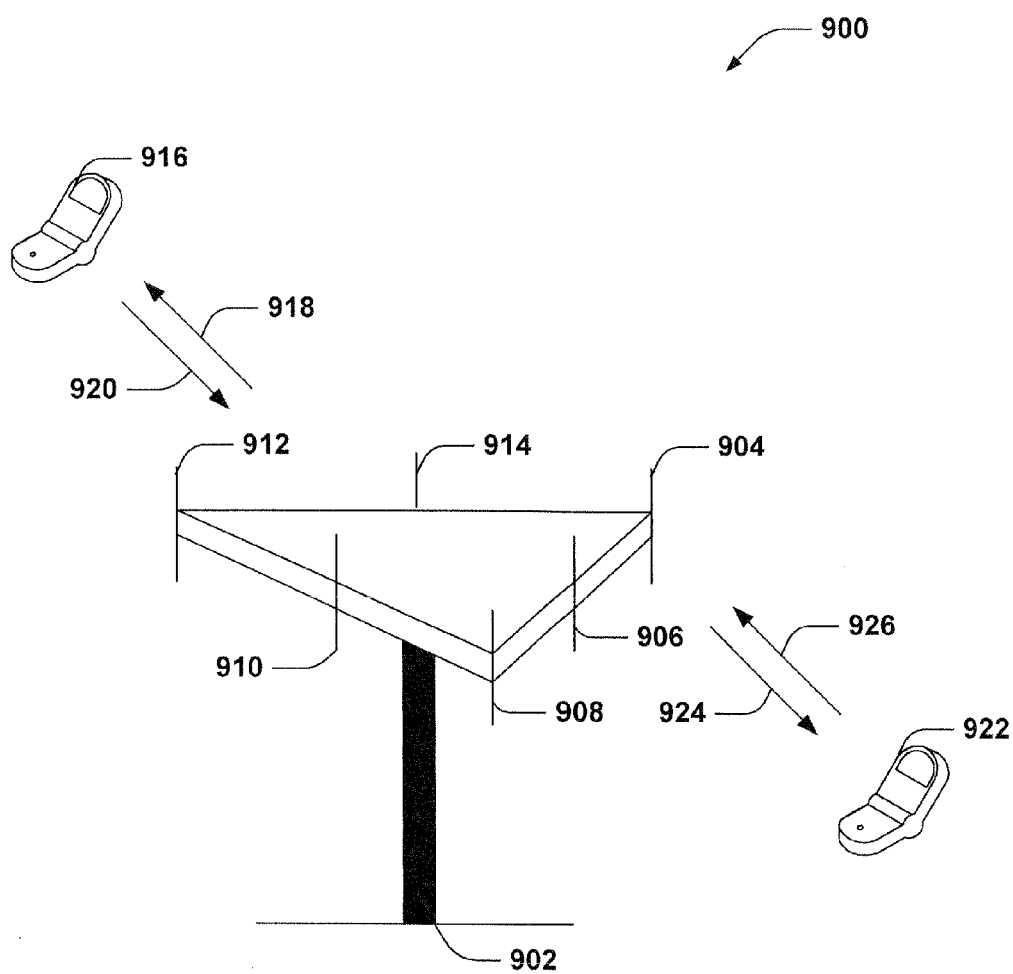
FIG. 9 is a block diagram of an aspect of a wireless communication system in accordance with various aspects set forth herein.

FIG. 9 illustrates a wireless communication system 900 in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted. According to an example, system 900 can be a multiple-input multiple-output (MIMO) communication system or similar system that allows assigning multiple carriers between base station 902 and mobile devices 916 and/or 922.

Figure 10:
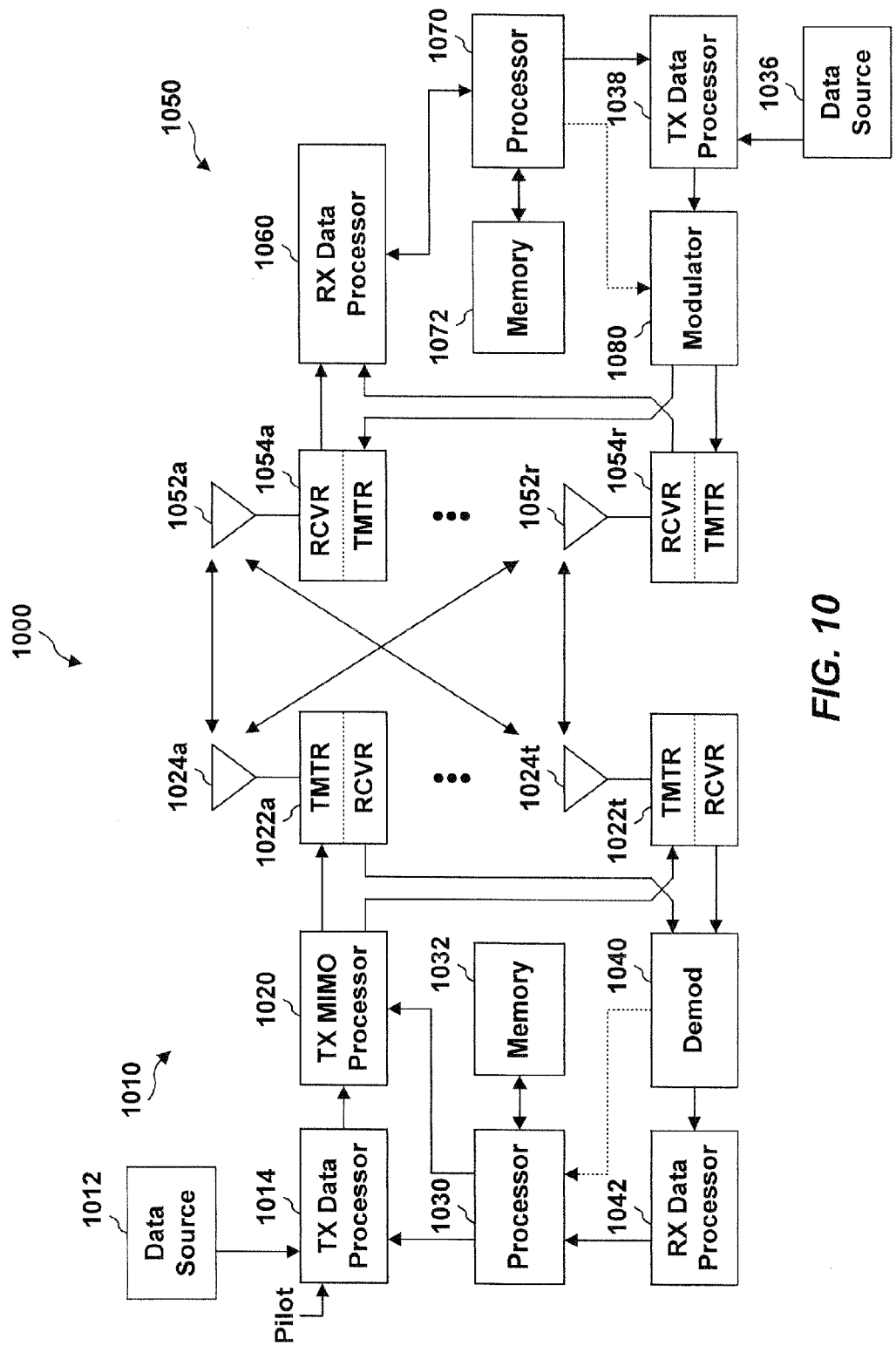
FIG. 10 is a schematic block diagram of an aspect of a wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3, 8, and 9) and/or methods (FIGS. 4-7) described herein to facilitate wireless communication there between. For example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (OPS K), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for mitigating interference in a wireless network, comprising:
   detecting a handover event related to a mobile device communicating with a base station, the handover event being an event A3 in third generation partnership project (3GPP) long term evolution (LTE), the event A3 being a condition where a signal quality of neighbor cell exceeds a signal quality of a serving cell plus an offset;
   determining whether the handover event is one of an early handover event or a late handover event; and
   assigning a set of protected resources for communicating with the mobile device after the handover event, based on the handover event.

2. The method of claim 1, further comprising negotiating the set of protected resources with the base station.

3. The method of claim 1, further comprising receiving an indication, from the base station, that the handover event corresponds to the early handover event or the late handover event.

4. The method of claim 1, further comprising receiving at least one signal quality measurement from the base station, wherein the determining whether the handover event is one of the early handover event or the late handover event is based in part on the at least one signal quality measurement.

5. The method of claim 4, wherein the at least one signal quality measurement comprises a difference between a plurality of signal quality measurements.

6. The method of claim 4, wherein the at least one signal quality measurement comprises a signal quality measurement of a strongest cell on a frequency and a corresponding cell identification.

7. The method of claim 1, wherein the offset corresponds to a signal quality difference threshold for performing late handover, and further comprising adjusting the offset from a first threshold signal quality difference to a second threshold signal quality difference, the first threshold signal quality difference and the second threshold signal quality difference corresponding to different values.

8. The method of claim 7, further comprising:
   receiving a signal quality measurement difference from the base station; and
   wherein the determining comprises determining that the handover event corresponds to the late handover event based on the received signal quality measurement difference, the first threshold signal quality difference, and the second threshold signal quality difference.

9. An apparatus for mitigating interference in a wireless network, comprising:
   means for detecting a handover event related to a mobile device communicating with a base station, the handover event being an event A3 in third generation partnership project (3GPP) long term evolution (LTE), the event A3 being a condition where a signal quality of neighbor cell exceeds a signal quality of a serving cell plus an offset; and
   means for assigning a set of protected resources for communicating with the mobile device based on determining whether the handover event is one of an early handover event or a late handover event.

10. The apparatus of claim 9, further comprising means for negotiating the set of protected resources with the base station.

11. An apparatus for mitigating interference in a wireless network, comprising:
   at least one processor configured to:
     detect a handover event related to a mobile device communicating with a base station, the handover event being an event A3 in third generation partnership project (3GPP) long term evolution (LTE), the event A3 being a condition where a signal quality of neighbor cell exceeds a signal quality of a serving cell plus an offset;
     determine whether the handover event is one of an early handover event or a late handover event; and
     assign a set of protected resources for communicating with the mobile device after the handover event, based on the handover event; and
   a memory coupled to the at least one processor.

12. The apparatus of claim 11, wherein the at least one processor is further configured to negotiate the set of protected resources with the base station.

13. The apparatus of claim 11, wherein the at least one processor determines based in part on receiving an indication from the base station that the handover event corresponds to the early handover event or the late handover event.

14. The apparatus of claim 11, wherein the at least one processor determines whether the handover event is one of the early handover event or the late handover event based in part on receiving at least one signal quality measurement from the base station.

15. The apparatus of claim 14, wherein the at least one signal quality measurement comprises a difference between a plurality of signal quality measurements.

16. The apparatus of claim 14, wherein the at least one signal quality measurement comprises a signal quality measurement of a strongest cell on a frequency and a corresponding cell identification.

17. The apparatus of claim 11, wherein the offset corresponds to a signal quality difference threshold for performing late handover, and the at least one processor is further configured to adjust the offset from a first threshold signal quality difference to a second threshold signal quality difference, the first threshold signal quality difference and the second threshold signal quality difference corresponding to different values for performing late handover.

18. The apparatus of claim 17, wherein the at least one processor determines the handover event corresponds to the late handover event based on a received signal quality difference related to the base station, the first threshold signal quality difference and the second threshold signal quality difference.

19. A computer program product for mitigating interference in a wireless network, comprising:
a non-transitory computer-readable medium, comprising:
code for causing at least one computer to detect a handover event related to handing over communications of a mobile device to a base station, the handover event being an event A3 in third generation partnership project (3GPP) long term evolution (LTE), the event A3 being a condition where a signal quality of neighbor cell exceeds a signal quality of a serving cell plus an offset, the event A3 having an associated event A3 threshold corresponding to the offset;
code for causing the at least one computer to transmit a handover message to the base station indicating whether the handover event corresponds to an early handover event; and
code for modifying the event A3 threshold to cause the early handover event.

20. The computer program product of claim 19, wherein the code for causing the at least one computer to detect detects the handover event in part by determining that a signal quality difference of the base station is at least at the event A3 threshold.

21. A computer program product for mitigating interference in a wireless network, comprising:
a non-transitory computer-readable medium, comprising:
code for causing at least one computer to detect a handover event related to a mobile device communicating with a base station, the handover event being an event A3 in third generation partnership project (3GPP) long term evolution (LTE), the event A3 being a condition where a signal quality of neighbor cell exceeds a signal quality of a serving cell plus an offset;
code for causing the at least one computer to determine whether the handover event is one of an early handover event or a late handover event; and
code for causing the at least one computer to assign a set of protected resources for communicating with the mobile device after the handover event, based on the handover event.

22. The computer program product of claim 21, wherein the computer-readable medium further comprises code for causing the at least one computer to negotiate the set of protected resources with the base station.

23. A method for mitigating interference in a wireless network, comprising:
detecting a handover event related to handing over communications of a mobile device to a base station, the handover event being an event A3 in third generation partnership project (3GPP) long term evolution (LTE), the event A3 being a condition where a signal quality of neighbor cell exceeds a signal quality of a serving cell plus an offset, the event A3 having an associated event A3 threshold corresponding to the offset;
transmitting a handover message to the base station indicating whether the handover event corresponds to an early handover event; and
modifying the event A3 threshold to cause the early handover event.

24. The method of claim 23, wherein the detecting the handover event comprises determining that a signal quality difference of the base station is at least at the event A3 threshold.

25. The method of claim 23, further comprising commanding the mobile device to generate a measurement report based on determining a signal quality measurement difference based at least in part on a reference signal received power of the base station.

26. The method of claim 23, further comprising commanding the mobile device to generate a measurement report based on signals received over colliding reference signals in time division multiplexing.

27. The method of claim 23, further comprising generating the handover message to include a signal quality difference of the base station.

28. The method of claim 23, wherein the detecting the handover event further comprises determining whether a signal quality is below a threshold and/or whether a base station signal quality of the base station is above a neighbor threshold.

29. An apparatus for mitigating interference in a wireless network, comprising:
means for detecting a handover event related to handing over communications of a mobile device to a base station, the handover event being an event A3 in third generation partnership project (3GPP) long term evolution (LTE), the event A3 being a condition where a signal quality of neighbor cell exceeds a signal quality of a serving cell plus an offset, the event A3 having an associated event A3 threshold corresponding to the offset;
means for transmitting a handover message to the base station indicating whether the handover event corresponds to an early handover event; and
means for modifying the threshold of the event A3 to cause the early handover event.

30. The method of claim 29, wherein the means for detecting detects the handover event in part by determining that a signal quality difference of the base station is at least at the event A3 threshold.

31. An apparatus for mitigating interference in a wireless network, comprising:
at least one processor configured to:
detect a handover event related to handing over communications of a mobile device to a base station, the handover event being an event A3 in third generation partnership project (3GPP) long term evolution (LTE), the event A3 being a condition where a signal quality of neighbor cell exceeds a signal quality of a serving cell plus an offset, the event A3 having an associated event A3 threshold corresponding to the offset;
transmit a handover message to the base station indicating whether the handover event corresponds to an early handover event; and modify the event A3 threshold to cause the early handover event; and a memory coupled to the at least one processor.

32. The apparatus of claim 31, wherein the at least one processor detects the handover event in part by determining that a signal quality difference of the base station is at least at the event A3 threshold.

33. The apparatus of claim 31, wherein the at least one processor is further configured to generate the handover message to include a signal quality difference of the base station.

34. The apparatus of claim 31, wherein the at least one processor detects the handover event in part by determining whether a signal quality is below a threshold and/or whether a base station signal quality of the base station is over a neighbor threshold.

35. The apparatus of claim 31, wherein the at least one processor is further configured to command the mobile device to generate a measurement report based on determining a signal quality measurement difference based at least in part on a reference signal received power of the base station.

36. The apparatus of claim 31, wherein the at least one processor is further configured to command the mobile device to generate a measurement report based on signals received over colliding reference signals in time division multiplexing.

* * * * *